(12) United States Patent
Ahn et al.

(10) Patent No.: US 8,488,538 B2
(45) Date of Patent: Jul. 16, 2013

(54) METHOD FOR TRANSMITTING UPLINK CONTROL SIGNAL

(75) Inventors: Seung Jin Ahn, Anyang-si (KR); Seung Woo Nam, Anyang-si (KR); Mu Ryong Kim, Anyang-si (KR); Hyun Wook Park, Anyang-si (KR)

(73) Assignee: LG Electronics Inc., Seoul (KR)

( * ) Notice: Subject to any disclaimer, the term of this patent is extended or adjusted under 35 U.S.C. 154(b) by 230 days.

(21) Appl. No.: 12/682,891

(22) PCT Filed: Dec. 30, 2008

(86) PCT No.: PCT/KR2008/007809
§ 371 (c)(1),
(2), (4) Date: Apr. 13, 2010

(87) PCT Pub. No.: WO2009/088172
PCT Pub. Date: Jul. 16, 2009

(65) Prior Publication Data
US 2010/0226326 A1 Sep. 9, 2010

(30) Foreign Application Priority Data
Jan. 4, 2008 (KR) .................. 10-2008-0001294

(51) Int. Cl.
*H04W 72/00* (2009.01)
(52) U.S. Cl.
USPC ........... 370/329; 370/328; 370/335; 370/342; 370/345; 455/522; 455/450; 455/69

(58) Field of Classification Search
USPC .......... 370/329, 335, 342, 345, 328; 455/522, 455/450, 69
See application file for complete search history.

(56) References Cited

U.S. PATENT DOCUMENTS

| 7,640,373 | B2* | 12/2009 | Cudak et al. ................... 710/19 |
| 2003/0108027 | A1* | 6/2003 | Kim et al. ..................... 370/345 |
| 2005/0047393 | A1* | 3/2005 | Liu ................................ 370/352 |
| 2005/0233754 | A1* | 10/2005 | Beale ......................... 455/452.2 |
| 2007/0097981 | A1* | 5/2007 | Papasakellariou ........... 370/394 |
| 2007/0115880 | A1* | 5/2007 | Huh et al. ..................... 370/329 |
| 2007/0133458 | A1* | 6/2007 | Chandra et al. .............. 370/329 |
| 2007/0155391 | A1* | 7/2007 | Kang et al. ................... 455/450 |
| 2007/0207810 | A1* | 9/2007 | Cho et al. ..................... 455/450 |
| 2007/0254595 | A1* | 11/2007 | Yoon et al. ................ 455/67.14 |
| 2008/0089285 | A1* | 4/2008 | Pirskanen et al. ........... 370/329 |
| 2008/0233964 | A1* | 9/2008 | McCoy et al. ................ 455/450 |
| 2009/0046582 | A1* | 2/2009 | Sarkar et al. ............... 370/230.1 |
| 2009/0073955 | A1* | 3/2009 | Malladi ........................ 370/349 |
| 2009/0088195 | A1* | 4/2009 | Rosa et al. .................... 455/507 |
| 2009/0109908 | A1* | 4/2009 | Bertrand et al. ............. 370/329 |

* cited by examiner

*Primary Examiner* — Rasheed Gidado
(74) *Attorney, Agent, or Firm* — McKenna Long & Aldridge, LLP

(57) ABSTRACT

A method for transmitting an uplink control signal includes receiving scheduling information for transmission of the uplink control signal, and transmitting the uplink control signal according to the scheduling information. Various control signals can be transmitted without interference with other control signals while maintaining a single carrier property.

5 Claims, 4 Drawing Sheets

US 8,488,538 B2

METHOD FOR TRANSMITTING UPLINK CONTROL SIGNAL

This application is a 35 U.S.C. § 371 National Stage entry of International Application No. PCT/KR2008/007809, filed on Dec. 30, 2008, and claims priority to Korean Application No. 10-2008-0001294, filed on Jan. 4, 2008, each of which is hereby incorporated by reference in its entirety as if fully set forth herein.

TECHNICAL FIELD

The present invention relates to wireless communications, and more particularly, to a method for transmitting an uplink control signal in a wireless communication system.

BACKGROUND ART

In order to maximize efficiency of a limited radio resource in a wideband wireless communication system, methods for more effectively transmitting data in time, space, and frequency domains have been provided.

Transmission of a control signal on the time, space, and frequency domains is an essential and indispensable factor to implement various transmission or reception methods for high-speed packet transmission. A channel for transmitting the control signal is referred to as a control channel. Examples of an uplink control signal include an acknowledgement (ACK)/negative-acknowledgement (NACK) signal that is a response for downlink data transmission, a channel quality indicator (CQI) indicating downlink channel quality, a sounding reference signal for uplink scheduling, a scheduling request signal for requesting uplink radio resource allocation, etc.

In general, there is a limitation in radio resources allocated to the control channel. This is because a transfer rate can be reduced when a large amount of radio resources are allocated to the control channel since a small amount of radio resources are allocated to a data channel (or traffic channel). However, scheduling may not be properly performed when the control signal is not transmitted. In particular, the uplink control signal is restrictively transmitted due to a limitation in power or battery capacity of a user equipment.

Accordingly, there is a need for a method capable of effectively transmitting various uplink control signals.

DISCLOSURE OF INVENTION

Technical Problem

The present invention provides a method for scheduling transmission of an uplink control signal by using uplink scheduling information.

Technical Solution

According to an aspect of the present invention, a method for transmitting an uplink control signal includes receiving scheduling information for transmission of the uplink control signal, and transmitting the uplink control signal according to the scheduling information.

In some embodiments, the uplink control signal may be at least one of an acknowledgment (ACK)/negative-acknowledgement (NACK) signal, a channel quality indicator (CQI), and a sounding reference signal. The scheduling information may be received through a physical downlink control channel (PDCCH), or the scheduling information may be a medium access control (MAC) message and is received through a physical downlink shared channel (PDSCH).

According to another aspect of the present invention, a method for scheduling an uplink control signal includes transmitting scheduling information for transmission of the uplink control signal, and receiving the uplink control signal according to the scheduling information.

Advantageous Effects

Various control signals such as an acknowledgment (ACK)/negative-acknowledgement (NACK) signal, a channel quality indicator (CQI), and a sounding reference signal can be transmitted without interference with other control signals while maintaining a single carrier property.

MODE FOR THE INVENTION

Figure 1:
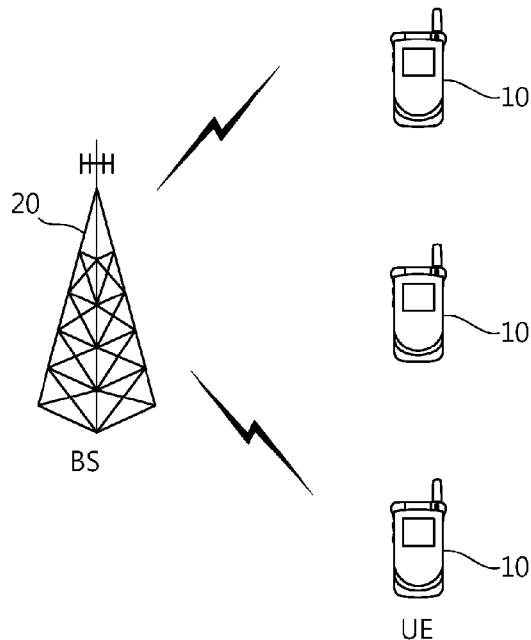
FIG. 1 shows a wireless communication system.

FIG. 1 shows a wireless communication system. The wireless communication system can be widely deployed to provide a variety of communication services, such as voices, packet data, etc.

Referring to FIG. 1, the wireless communication system includes at least one user equipment (UE) 10 and a base station (BS) 20. The UE 10 may be fixed or mobile, and may be referred to as another terminology, such as a mobile station (MS), a user terminal (UT), a subscriber station (SS), a wireless device, etc. The BS 20 is generally a fixed station that communicates with the UE 10 and may be referred to as another terminology, such as a node-B, a base transceiver system (BTS), an access point, etc. There are one or more cells within the coverage of the BS 20.

Hereinafter, a downlink is defined as a communication link from the BS 20 to the UE 10, and an uplink is defined as a communication link from the UE 10 to the BS 20. In the downlink, a transmitter may be a part of the BS 20, and a receiver may be a part of the UE 10. In the uplink, the transmitter may be a part of the UE 10, and the receiver may be a part of the BS 20.

Figure 2:
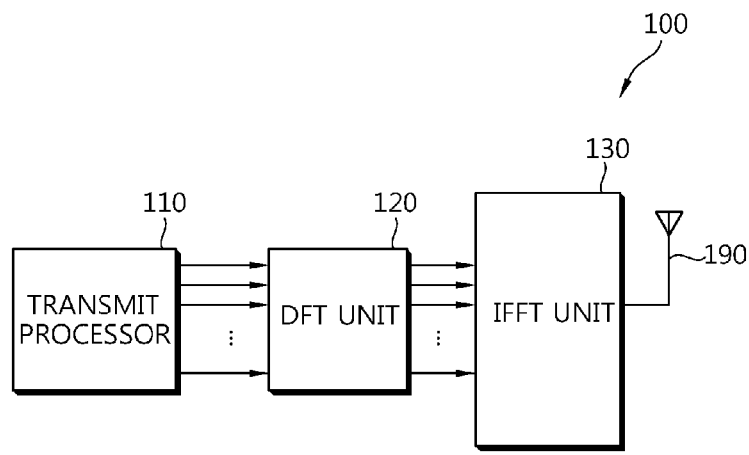
FIG. 2 is a block diagram showing a transmitter according to an embodiment of the present invention.

FIG. 2 is a block diagram showing a transmitter according to an embodiment of the present invention.

Referring to FIG. 2, a transmitter 100 includes a transmit (Tx) processor 110, a discrete Fourier transform (DFT) unit 120 that performs a DFT, and an inverse fast Fourier transform (IFFT) unit 130 that performs an IFFT. The DFT unit 120 performs the DFT on data processed by the Tx processor 110 and outputs a frequency-domain symbol. The data input to the DFT unit 120 may be a control signal and/or user data. The IFFT unit 130 performs the IFFT on the received frequency-domain symbol and outputs a Tx signal. The Tx signal is a time domain signal and is transmitted through a Tx antenna 190. The time-domain symbol output from the IFFT unit 130 is referred to as an orthogonal frequency division multiplexing (OFDM) symbol. Since the IFFT is performed after DFT spreading, the time-domain symbol output from the IFFT unit 130 is also referred to as a single carrier-frequency division multiple access (SC-FDMA) symbol. An SC-FDMA scheme is a scheme in which spreading is achieved by performing the DFT at a previous stage of the IFFT unit 130 and is advantageous over an OFDM scheme in terms of decreasing a peak-to-average power ratio (PAPR).

Although the SC-FDMA scheme is described herein, multiple access schemes used in the present invention are not limited thereto. For example, various multiple access schemes may be used such as code division multiple access (CDMA), time division multiple access (TDMA), frequency division multiple access (FDMA), single-carrier FDMA (SC-FDMA), orthogonal frequency division multiple access (OFDMA), etc.

Different multiple access schemes may be used for uplink and downlink in the wireless communication system. For example, the SC-FDMA scheme may be used for uplink, and the OFDMA scheme may be used for downlink.

Figure 3:
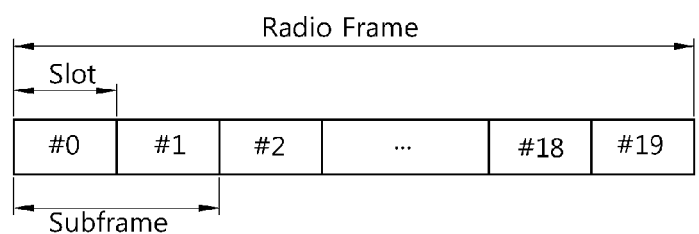
FIG. 3 shows a structure of a radio frame.

FIG. 3 shows a structure of a radio frame.

Referring to FIG. 3, the radio frame includes 10 subframes. One subframe can include two slots. One slot can include a plurality of OFDM symbols in a time domain and at least one subcarrier in a frequency domain. The slot is a unit of radio resource allocation in the time domain. For example, one slot can include 7 or 6 OFDM symbols.

The radio frame structure is shown for exemplary purposes only, and thus the number of subframes included in the radio frame or the number of slots included in the subframe or the number of OFDM symbols included in the slot is not limited thereto.

Figure 4:
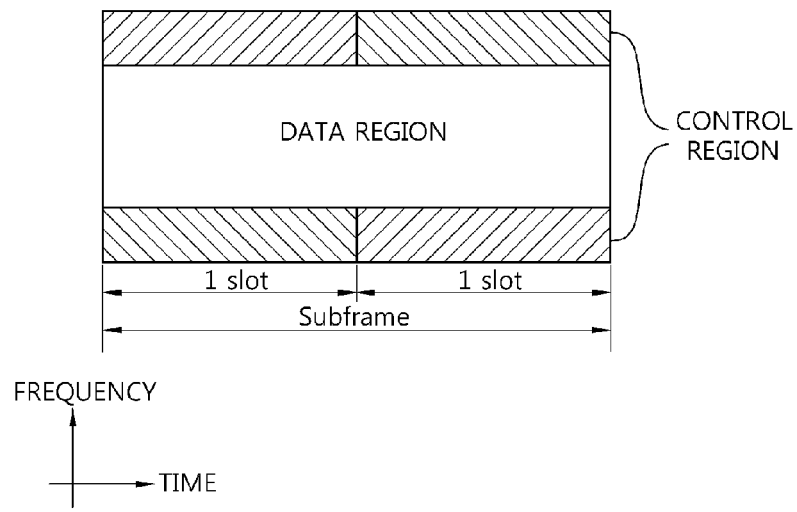
FIG. 4 shows a structure of an uplink subframe.

FIG. 4 shows a structure of an uplink subframe.

Referring to FIG. 4, the uplink subframe can be divided into two parts, that is, a control region and a data region. Since the control region and the data region use different frequency bands, frequency division multiplexing (FDM) have been achieved.

The control region is used to transmit only a control signal and is generally assigned to a control channel. The data region is used to transmit data and is generally assigned to a data channel. A channel assigned to the control region is referred to as a physical uplink control channel (PUCCH). A channel assigned to the data region is referred to as a physical uplink shared channel (PUSCH). The control channel transmits the control signal. The data channel transmits the user data. The control signal includes a plurality of signals other than the user data. That is, the control signal includes an acknowledgement (ACK)/negative-acknowledgement (NACK) signal, a channel quality indicator (CQI), a scheduling request signal, a sounding reference signal, etc.

Only the control signal is carried on the control region. The user data and the control signal can be carried together on the data region. That is, when a UE transmits only the control signal, the control region can be assigned to transmit the control signal. In addition, when the UE transmits both the data and the control signal, the data region can be assigned to transmit the data and the control signal. In an exceptional case, even if only the control signal is transmitted, the control signal may be transmitted in a large amount or the control signal may not be suitable to be transmitted through the control region. In this case, a radio resource can be assigned to the data region to transmit the control signal.

If there is no data to be transmitted when the control signal is transmitted, a transmitter transmits the control signal by modulating the control signal in the control region according to the SC-FDMA scheme. As a method for transmitting the control signal in the control region, frequency division multiplexing (FDM) or code division multiplexing (CDM) may be used between UEs.

A slot allocated to each UE is frequency-hopped on a subframe. That is, one of two slots allocated to one UE is assigned to one side of a frequency band, and the other slot is assigned to the other side of the frequency band. A frequency diversity gain can be obtained by transmitting one control channel for the UE through the slots, each of which is allocated to a different subcarrier.

For clarity, it is assumed hereinafter that one slot consists of 7 OFDM symbols, and one subframe including two slots consists of 14 OFDM symbols. The number of OFDM symbols included in one subframe or the number of OFDM symbols included in one slot is for exemplary purposes only, and thus technical features of the present invention is not limited thereto.

Figure 5:
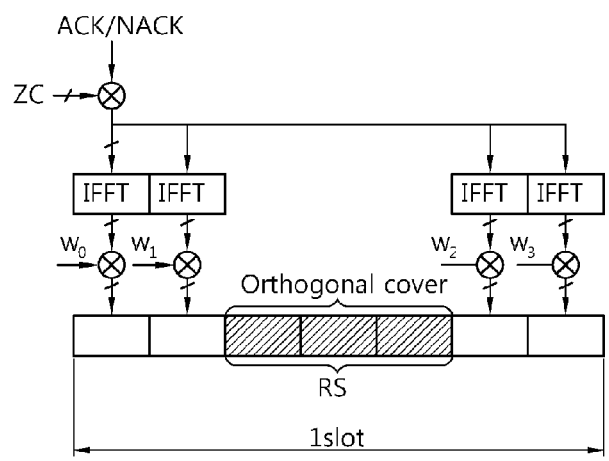
FIG. 5 shows a structure of an acknowledgment (ACK)/negative-acknowledgement (NACK) channel.

FIG. 5 shows a structure of an ACK/NACK channel. The ACK/NACK channel is a control channel through which an ACK/NACK signal is transmitted to perform a hybrid automatic repeat request (HARM) operation. The ACK/NACK signal is a transmission and/or reception confirm signal for downlink data.

Referring to FIG. 5, among 7 OFDM symbols included in one slot, a reference signal (RS) is transmitted in three consecutive OFDM symbols in the middle portion of the slot and the ACK/NACK signal is transmitted in the remaining four OFDM symbols. The RS is transmitted in three contiguous OFDM symbols located in the middle portion of the slot. The location and number of symbols used in the RS may vary depending on a control channel. Changes in the location and number of the symbols may result in changes in those of symbols used in the ACK/NACK signal.

When the control signal is transmitted within a pre-assigned band, frequency-domain spreading and time-domain spreading are simultaneously used to increase the number of multiplexable UEs and the number of control channels. A frequency-domain spreading code is used to spread the ACK/NACK signal on a frequency domain. A Zadoff-Chu (ZC) sequence is one of constant amplitude zero auto-correlation (CAZAC) sequences and can be used as the frequency-domain spreading code.

A k-th element c(k) of a ZC sequence having an index of M can be expressed as shown:

MathFigure 1

$$c(k) = \exp\left\{-\frac{j\pi M k(k+1)}{N}\right\}, \text{ when } N \text{ is odd number} \quad [\text{Math. 1}]$$

$$c(k) = \exp\left\{-\frac{j\pi M k^2}{N}\right\}, \text{ when } N \text{ is even number}$$

where N denotes a length of the ZC sequence. The index M is a natural number equal to or less than N. M and N are relatively prime to each other.

UEs can be respectively identified by using ZC sequences having different circular shift values. The number of available circular shifts may vary according to channel delay spread.

After being subjected to frequency-domain spreading, the ACK/NACK signal is subjected to IFFT processing and is then spread again in a time domain by using a time-domain spreading code. The ACK/NACK signal is spread using four time-domain spreading codes $w_0$, $w_1$, $w_2$, and $w_3$ for four OFDM symbols. The RS is spread using a spreading code having a length of 3.

Figure 6:
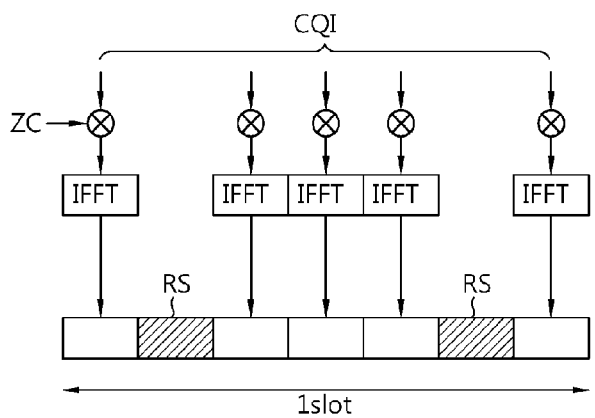
FIG. 6 shows a structure of a channel quality indicator (CQI) channel.

FIG. 6 shows a structure of a CQI channel. The CQI channel is a control channel for transmitting a CQI.

Referring to FIG. 6, among 7 OFDM symbols included in one slot, a reference signal (RS) is transmitted in 2 OFDM symbols separated by an interval of 3 OFDM symbols, and the CQI is transmitted in the remaining 5 OFDM symbols. This is for exemplary purposes only, and thus the location or number of OFDM symbols used for the RS or the location or number of symbols used for the CQI can be modified. When quadrature phase shift keying (QPSK) mapping is used for one OFDM symbol, one slot can carry a 10-bit CQI value since a 2-bit CQI value can be carried. For one subframe, a maximum of 20-bit CQI value can be carried. In addition to the QPSK, other modulation schemes (e.g., 16-quadrature amplitude modulation (QAM)) can be used for the CQI.

A frequency-domain spreading code is used to spread the CQI over a frequency domain. A ZC sequence can be used as the frequency-domain spreading code.

Unlike 2-dimensional spreading used in the ACK/NACK channel, only 1-dimensional spreading is used in the CQI channel, and a transmission capacity of the CQI is increased. Although only the frequency-domain spreading is described herein as an example, time-domain spreading can also be used in the CQI channel.

Figure 7:
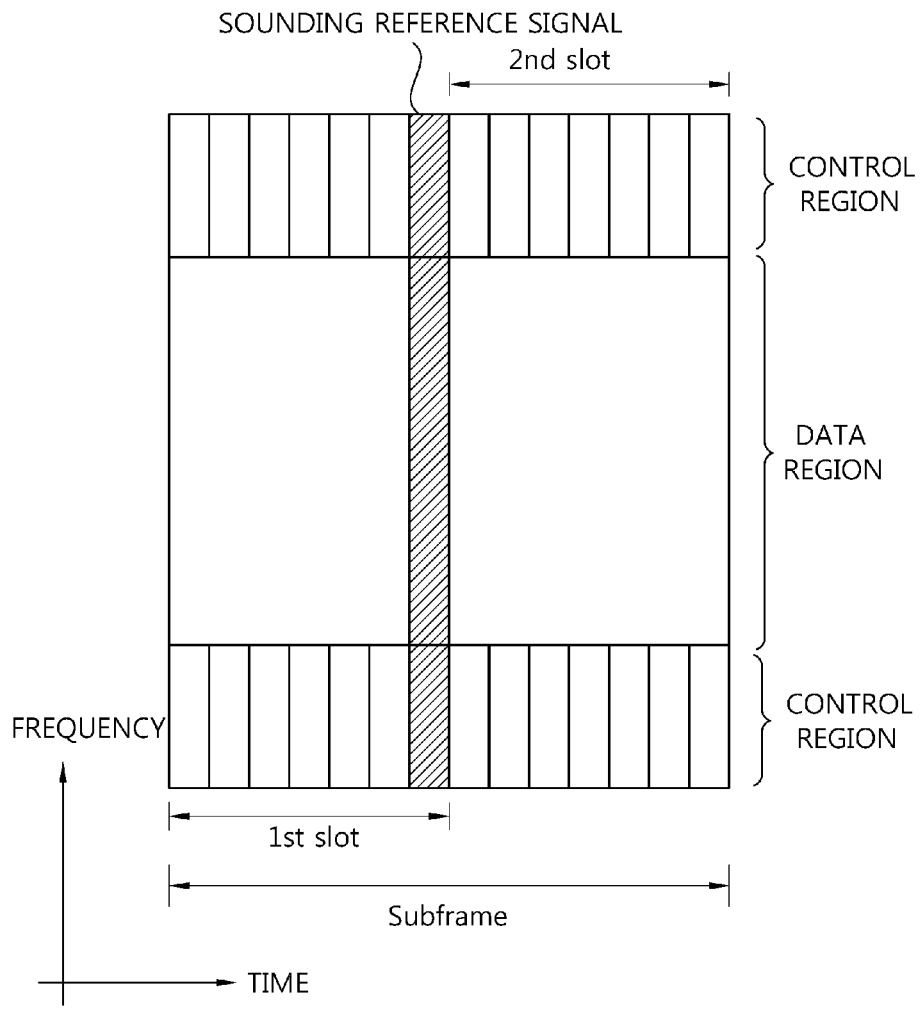
FIG. 7 shows an example of an uplink subframe for transmitting a sounding reference signal.

FIG. 7 shows an example of an uplink subframe for transmitting a sounding reference signal (SRS).

Referring to FIG. 7, the subframe can be divided into two parts, i.e., a control region and a data region. The SRS may be transmitted through one OFDM symbol throughout the entire frequency band. The location and number of OFDM symbols on which the SRS is arranged are for exemplary purposes only, and thus the SRS can be arranged on two or more OFDM symbols.

The SRS is transmitted for uplink scheduling from a UE to a BS to measure an uplink channel response as accurately as possible. Unlike an RS for data demodulation, the SRS is transmitted throughout the entire frequency band. The SRS may be transmitted throughout the entire uplink frequency band at once or may be split over a plurality of frequency bands so as to be sequentially transmitted.

Since the SRS occupies one OFDM symbol on one subframe, the SRS is arranged on one of two slots. However, it is not mandatory to transmit the SRS in every subframe according to a system. The SRS can be transmitted periodically or non-periodically.

To maintain an orthogonality of a control signal transmitted through a control channel, another RS or another control signal must not be multiplexed with an OFDM symbol on which the SRS is transmitted. That is, a system operation must be achieved by designing the ACK/NACK channel or the CQI channel in such a manner that neither one of the ACK/NACK signal, the CQI, and the RS is arranged on the OFDM symbol on which the SRS is arranged or in such a manner that there is no resource region where the control signal and the SRS overlap at the same time. If the ACK/NACK or the CQI is previously arranged in a resource region (e.g., OFDM symbol) to which the SRS is allocated, a portion where the ACK/NACK signal or the CQI overlaps is punctured from the resource region.

It is difficult to simultaneously transmit the ACK/NACK signal and the CQI. This is because the ACK/NACK channel and the CQI channel are not orthogonal to each other. The SRS is also difficult to be transmitted simultaneously with the ACK/NACK signal the CQI. This is because a single carrier property cannot be kept. However, since one BS generally provides a service to a plurality of UEs, there is a need to schedule transmission of the ACK/NACK channel, the CQI channel, and the SRS.

Figure 8:
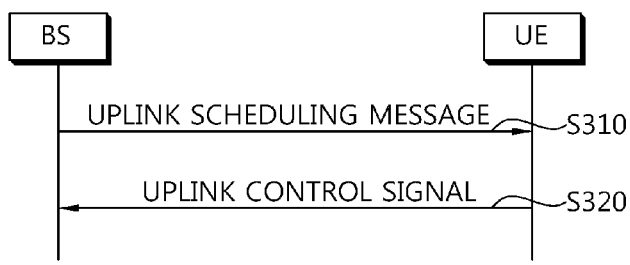
FIG. 8 is a flow diagram showing a method for transmitting a control signal according to an embodiment of the present invention.

FIG. 8 is a flow diagram showing a method for transmitting a control signal according to an embodiment of the present invention.

Referring to FIG. 8, a BS transmits an uplink scheduling message to a UE (step S310). The uplink scheduling message can be transmitted through a physical dedicated control channel (PDCCH) or can be transmitted using a medium access control (MAC) message. The uplink scheduling message includes scheduling information for transmission of an uplink control signal. When transmission periods for at least two uplink control signal are overlapped, the scheduling information may represent which uplink control signal is transmitted.

The UE transmits the uplink control signal by using the scheduling information included in the uplink scheduling message (step S320).

Assume that an ACK/NACK signal and a CQI are used. In general, the CQI is periodically transmitted, and the ACK/NACK signal is transmitted in an event-driven manner. In this case, the BS can know an exact time at which the UE transmits the ACK/NACK signal. This is because the UE transmits the ACK/NACK signal at a predetermined time after receiving downlink data. The ACK/NACK signal is generally transmitted with a higher priority than CQI information. If the CQI and the ACK/NACK signal have to be simultaneously transmitted, a specific control is required.

If it is assumed that the uplink scheduling information is a CQI request (CQI-REQ) and if CQI reporting is periodically performed, CQI transmission can be controlled with respect to the ACK/NACK signal according to Table 1 below.

TABLE 1

| CQI-REQ | CQI period | CQI transmission |
|---------|------------|------------------|
| 0 | ○ | X (ACK/NACK transmission) |
| 0 | x | x |
| 1 | ○ | ○ |
| 1 | x | ○ |

If the CQI-REQ is '0', it indicates that CQI transmission is suspended. If the CQI-REQ is '1', it indicates that CQI transmission is performed. If the CQI-REQ is '0' and if it is a CQI period, the CQI is not transmitted. In this case, the ACK/NACK signal can be transmitted instead of the CQI. If the CQI-REQ is '0' and if it is not the CQI period, the CQI is not transmitted. If the CQI-REQ is '1' and if it is the CQI period, the CQI is transmitted. If the CQI-REQ is '1' and if it is not the CQI period, the CQI is transmitted.

Since the CQI-REQ is included in an uplink scheduling message and is then reported to the UE, collision between an ACK/NACK channel and a CQI channel can be avoided.

If there is a case where the ACK/NACK signal needs to be transmitted when the CQI-REQ is ' 1', the UE does not transmit the CQI but transmits only the ACK/NACK signal. When the CQI is not transmitted from the UE at a time estimated by the BS, the BS retransmits the CQI-REQ by setting the CQI-REQ to '1'.

When the uplink scheduling information is an SRS request (SRS-REQ), transmission of the SRS can be controlled with respect to the CQI and the ACK/NACK signal according to Table 2 below.

TABLE 2

| SRS-REQ | CQI transmission | ACK/NACK transmission | SRS transmission |
|---|---|---|---|
| 1 | x | x | o |
| 1 | o | x | o |
| 1 | x | o | o |
| 0 | don't care | don't care | X |

If the SRS-REQ is '0', it implies that SRS transmission is suspended. If the SRS-REQ is '1', it implies that SRS transmission is performed. If the SRS-REQ is '1' and if the CQI and the ACK/NACK signal are not transmitted, the SRS is transmitted. If the SRS-REQ is '1' and if the CQI or the ACK/NACK signal is transmitted, the SRS is transmitted by puncturing a portion corresponding to the SRS in the CQI channel or the ACK/NACK channel. If the SRS-REQ is '0', the SRS is not transmitted irrespective of whether the CQI or the ACK/NACK signal is transmitted.

Figure 9:
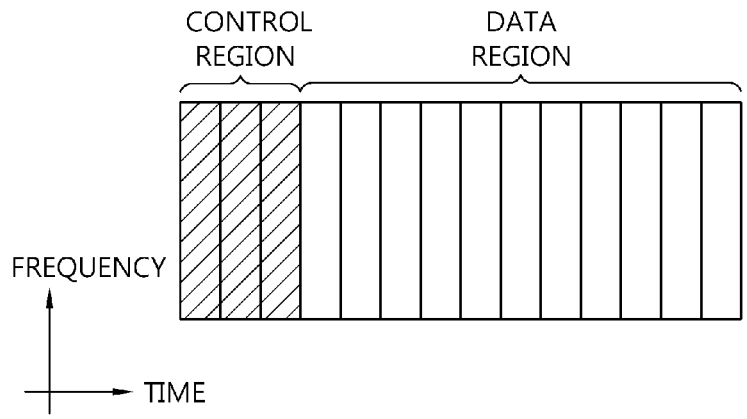
FIG. 9 shows a structure of a downlink subframe.

FIG. 9 shows a structure of a downlink subframe.

Referring to FIG. 9, 1st to 3rd OFDM symbols of the subframe are allocated to a control region, and the remaining OFDM symbols are allocated to a data region. A channel assigned to the control region is referred to as a physical downlink control channel (PDCCH). A channel assigned to the data channel is referred to as a physical downlink shared channel (PDSCH).

An uplink scheduling message can be transmitted through the PDCCH. This is because the uplink scheduling message is 1-bit or 2-bit information.

Figure 10:
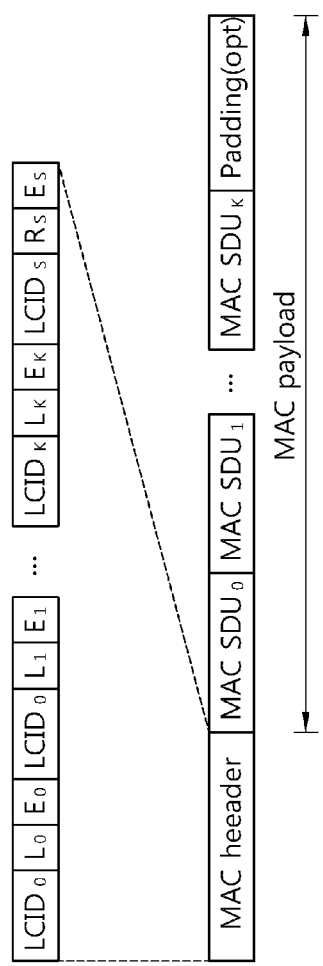
FIG. 10 shows an example of a medium access control (MAC) message.

FIG. 10 shows an example of a MAC message.

Referring to FIG. 10, the MAC message constitutes an uplink scheduling message. A MAC protocol data unit (PDU) includes a MAC header and a MAC payload including at least one MAC service data unit (SDU). The MAC header includes an LCID field, an L field, and an E field. The LCID field is a logical channel identifier (ID) field for identifying a logical channel instance of the MAC SDU. Each MAC SDU has one LCID. The L field indicates a length of the MAC SDU. The E field is a flag for indicating whether the MAC header includes more fields. If the E field is '0', the MAC header is followed by additional LCID, E, and L fields. If the E field is '1', the MAC header is followed by the MAC payload.

The MAC header includes an LCIDs and an Rs. The LCIDs is an ID indicating the Rs, i.e., scheduling information. The Rs is uplink scheduling information indicating an SRS-REQ and/or a CQI-REQ.

When there is no need to transmit a PDCCH for a specific period of time as in the case of a voice over IP (VoIP), the uplink scheduling message can be configured in a format of a MAC message and can be transmitted through a PDSCH.

The present invention can be implemented with hardware, software, or combination thereof. In hardware implementation, the present invention can be implemented with one of an application specific integrated circuit (ASIC), a digital signal processor (DSP), a programmable logic device (PLD), a field programmable gate array (FPGA), a processor, a controller, a microprocessor, other electronic units, and combination thereof, which are designed to perform the aforementioned functions. In software implementation, the present invention can be implemented with a module for performing the aforementioned functions. Software is storable in a memory unit and executed by the processor. Various means widely known to those skilled in the art can be used as the memory unit or the processor.

While the present invention has been particularly shown and described with reference to exemplary embodiments thereof, it will be understood by those skilled in the art that various changes in form and details may be made therein without departing from the spirit and scope of the invention as defined by the appended claims. The exemplary embodiments should be considered in descriptive sense only and not for purposes of limitation. Therefore, the scope of the invention is defined not by the detailed description of the invention but by the appended claims, and all differences within the scope will be construed as being included in the present invention.

The invention claimed is:

1. A method for transmitting, by a user equipment, an uplink control signal, the method comprising:

receiving a first request for a channel quality indicator (CQI) from a base station in a first subframe, the first request indicating that the CQI is not to be transmitted in a second subframe which is a next subframe of the first subframe, the second subframe being a subframe where the CQI is to be transmitted periodically and an acknowledgement/nonacknowledgement (ACK/NACK) signal is to be transmitted;

transmitting the ACK/NACK signal to the base station in the second subframe;

receiving a second request for the CQI from the base station in the second subframe, the second request indicating that the CQI is to be transmitted in a third subframe which is a next subframe of the second subframe;

transmitting the CQI to the base station in the third subframe.

2. The method of claim 1, wherein a value of the first request is 0, and wherein a value of the second request is 1.

3. The method of claim 1, wherein the first request and the second request are received through a physical downlink control channel (PDCCH).

4. The method of claim 1, wherein the first request and the second request are medium access control (MAC) messages and are received through a physical downlink shared channel (PDSCH).

5. The method of claim 4, wherein the MAC message includes a MAC header and a MAC payload including at least one MAC service data unit (SDU), wherein the MAC header includes a Logical Channel Identifier (LCID) field and an R field, and wherein the R field indicates the first request or the second request.

* * * * *